F. C. HIRDLER.
AUTOMATIC SIDE TRACKING SECTIONALIZER FOR ELECTRIC TRANSMISSION SYSTEMS.
APPLICATION FILED DEC. 13, 1910.

1,030,181.
Patented June 18, 1912.
2 SHEETS—SHEET 1.

WITNESSES
Howard D. Orr.
F. T. Chapman.

INVENTOR,
F. C. Hirdler,
BY
E. G. Siggers
ATTORNEY

UNITED STATES PATENT OFFICE.

FAIRBANKS C. HIRDLER, OF OKLAHOMA, OKLAHOMA.

AUTOMATIC SIDE-TRACKING SECTIONALIZER FOR ELECTRIC TRANSMISSION SYSTEMS.

1,030,181.  Specification of Letters Patent. Patented June 18, 1912.

Application filed December 13, 1910. Serial No. 597,107.

*To all whom it may concern:*

Be it known that I, FAIRBANKS C. HIRDLER, a citizen of the United States, residing at Oklahoma, in the county of Oklahoma and State of Oklahoma, have invented a new and useful Automatic Side-Tracking Sectionalizer for Electric Transmission Systems, of which the following is a specification.

This invention has reference to an automatic side tracking sectionalizer for electric transmission systems, and its object is to preserve the electrical continuity of a transmission system despite the establishment of conditions tending to render the system inoperative for the transmission of electrical energy, as, for instance, one or more of the transmission sections is broken at any point, or a short circuit arises or some other condition is present which in ordinary electric transmission systems renders the system inoperative.

In some long distance transmission lines, the system must of necessity traverse regions where there is liability of interference, usually from natural causes, with the proper working of the system, it frequently transpiring that one or more of the mains is broken by a falling tree or the supports of one or more of the mains are overturned or displaced in such manner as to break or ground such main, or one or more short circuits may be established during storms, or at times, by the falling of tree branches across the mains, or electrical storms may establish conditions which will put the main conductors out of service, or other conditions may arise which will interrupt either temporarily or permanently the transmission of electrical energy from the source to the point of utilization.

The present invention is designed to establish a path for the power current around any fault which may occur in the main transmission line, so that there is no interruption in the service whatever because of the fault, and if such fault be of a temporary nature, the main line circuit is automatically reëstablished.

In long transmission lines, the faults usually occur in limited zones. For instance, there may be a stretch of some miles where the system is particularly liable to injury from lightning discharges. There may occur another zone where storms are frequent and breaks or short circuits may occur because of such storms. Whatever be the conditions giving rise to faults interfering with the transmission of the current they may be readily overcome by the installation of the present invention in those portions of the transmission system liable to such faults, it usually transpiring that such conditions do not prevail throughout the entire length of the system.

The present invention while useful in connection with transmission systems where the system covers a comparatively limited territory, is more particularly useful in connection with such long distance systems as are necessary for the utilization of the energy of water powers, for in such case the natural conditions often make it necessary to establish the power station many miles distant from the point of utilization and in many instances the intervening country is such that interruptions in the service are liable to occur unless the transmission system is of a nature which cannot be interrupted for an appreciable length of time. In the present invention this is brought about by utilizing the electrical conditions established to cause the operation of means whereby the power current is side tracked or shunted around the fault in the main transmission line, so that the electrical continuity of the system as a whole remains practically constant, and there is no interruption in service even though considerable sections of the main system be rendered inoperative even to the extent of total destruction.

The invention will be best understood from a consideration of the following detailed description taken in connection with the accompanying drawings forming a part of this specification, with the understanding, however, that while the particular system disclosed is a practical system, the invention is not limited to the exact arrangement shown, but is susceptible to various changes or modifications so long as the salient features of the invention are retained.

For convenience of description and illustration it will be assumed that the invention is applied to a high pressure single phase alternating current transmission system, but the invention is equally applicable to a polyphase system or to a direct current transmission system for where in the alternating current systems transformers are used, the same result may be obtained in direct current systems by the use of appropriate resistances.

Figure 1:
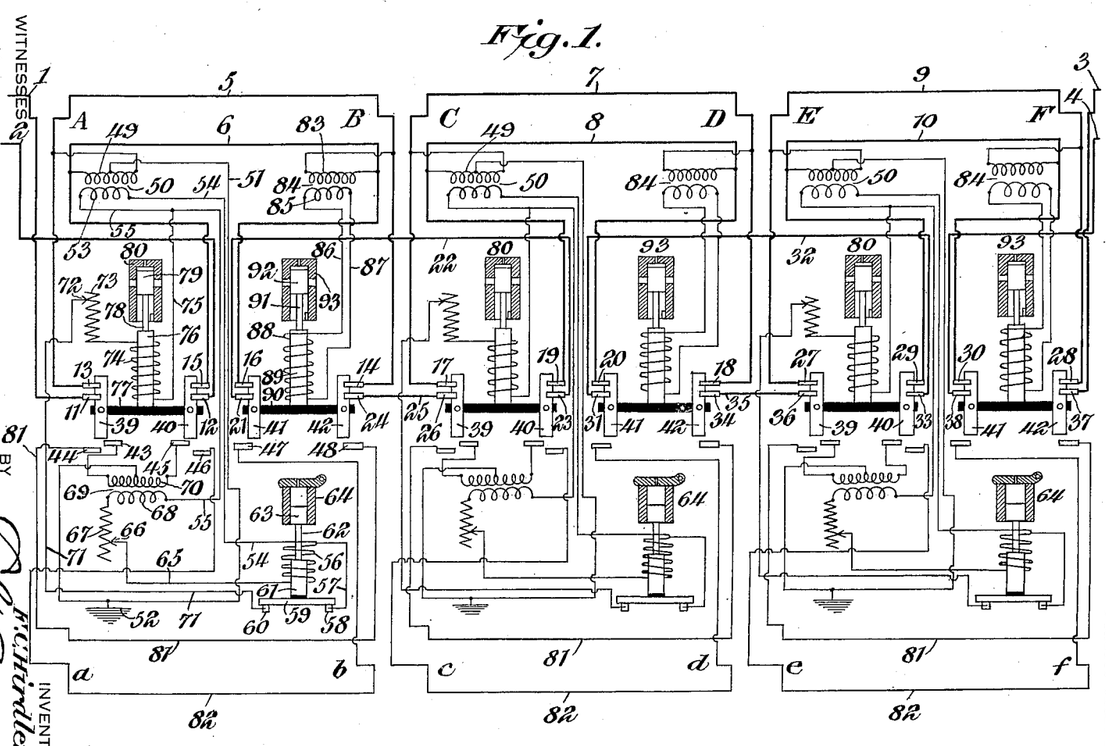
—Figure 1 is a diagram showing the application of the invention to a transmission line, it being assumed that the conditions are normal.

In Fig. 1 there are shown two main line conductors 1, 2 at the left hand side of said figure, which conductors may be assumed as coming from a suitable source of electrical energy, such as a power station, and at the right hand side of Fig. 1 there are shown other main line conductors 3, 4 like the conductors 1, 2, and these last named conductors may be assumed as proceeding toward the point of utilization, and it may be further assumed that the intervening space between the conductors 1, 2 and the conductors 3, 4 includes a zone where interruptions of the services from various causes are liable.

The main or normal transmission line through this zone of probable faults may be in one, two or more sections, and in the particular zone of Fig. 1 three sections are indicated, the first section being designated A—B, the second section being designated C—D, and the third section E—F. Section A—B includes conductors 5—6, the section C—D includes conductors 7—8, and the section E—F includes conductors 9—10, all of these conductors being normally connected in series with the conductors 1—2 and 3—4 to constitute the main transmission lines, and so long as normal conditions prevail, the current traverses these conductors.

The conductor 1 is connected to a terminal 11, and the conductor 2 is connected to a terminal 12. These terminals may be in the form of brushes. At one end the conductor 5 is connected to a brush or terminal 13 adjacent the brush 11, and at the other end the conductor 5 is connected to a brush 14. The conductor 6 is connected at one end to a brush 15 adjacent the brush 12, and at the other end to a brush 16. The conductor 7 is connected at one end to a brush 17, and at the other end to a brush 18. The conductor 8 is connected at one end to a brush 19 and at the other end to a brush 20. Adjacent the brush 16 is a brush 21 which is connected by a conductor 22 to another brush 23 adjacent the brush 19, while a brush 24 adjacent the brush 14 is connected by a conductor 25 to a brush 26 adjacent the brush 17.

The conductor 9 is connected at one end to a brush 27 and at the other end to a brush 28. The conductor 10 is connected at one end to a brush 29 and at the other end to a brush 30. Adjacent the brush 20 is another brush 31 connected by a conductor 32 to a brush 33 adjacent the brush 29, while the brush 34 adjacent the brush 18 is connected by a conductor 35 to a brush 36 adjacent the brush 27. The conductor 3 is connected to a brush 37 adjacent the brush 28, and the conductor 4 is connected to a brush 38 adjacent the brush 30.

The brushes 11 and 13 are normally coupled together by a contact plate 39, and the brushes 12 and 15 are normally coupled together by a contact plate 40. The brushes 16 and 21 are normally coupled together by a contact plate 41, and the brushes 14 and 24 are normally coupled together by a contact plate 42, the contact plates 39 and 40, and 41 and 42 being included in the section A—B, and each section C—D and E—F is provided with like contact plates.

In the position of the parts shown in Fig. 1, the conductor 1 is connected through the terminal brush 11 to the plate 39, and this plate is coupled to the conductor 5 by the brush 13. The conductor 5 is connected by its brush through the plate 42 to the brush 24, and by way of the conductor 25, brush 26, contact plate 39 of section C—D to the brush 17, thence to conductor 7, which latter is coupled to the conductor 9 by way of the brushes 18, 34, contact plate 42, conductor 35, brush 36, contact plate 39, and brush 27, while the said conductor 9 is coupled by the brushes 28 and 37 and the intervening contact plate 42 to the main line conductor 3. In like manner the circuit from main line conductor 2 to main line conductor 4 may be traced by way of the brush 12, plate 40, brush 15, conductor 6, brush 16, plate 41, brush 21, conductor 22, brush 23, plate 40, brush 19, conductor 8, brush 20, plate 41, brush 31, conductor 32, brush 33, plate 40, brush 29, conductor 10, brush 30, plate 41, and brush 38 to the conductor 4. There is thus a continuous circuit established through the protected zone and in order that this circuit may be readily traced, the conductors embraced therein have been shown by comparatively heavy lines, but the heavy lines in the figures have in themselves no significance.

In the path of the plate 39 are brushes or contacts 43—44, respectively, so displaced that the plate 39 in moving toward these contacts or brushes will engage the contact or brush 43 before engaging the brush 44. In like manner there is in the path of the plate 40 similarly displaced brushes 45—46. In the path of the plate 41 is a single brush 47, and in the path of the plate 42 is a single brush 48, these several brushes 43 to 48 being included in the section A—B, and similar brushes in similar relation to the contact plates are provided in each of the other sections C—D and E—F, respectively.

Connected across the conductors 5 and 6 of the section A—B at the left hand end of such section as viewed in Fig. 1, is the winding 49 of a transformer 50, and the windings 49 of like transformers 50 are connected across the like ends of the conductors 7—8 of section C—D and the conductors 9—10 of section E—F.

Since the parts now to be described are individual to each section and are identical in the several sections, the following description unless otherwise specified is limited to section A—B, with the understanding that like parts occur in sections C—D and E—F.

Branched off from an intermediate portion of the winding 49 is a conductor 51 leading to a ground 52. The transformer 50 has a winding 53, one terminal of which is connected to a conductor 54 and the other terminal of which is connected to a conductor 55. The conductor 54 leads to the winding of a solenoid 56 and is continued by way of a conductor 57 to a contact terminal 58 normally coupled by a bridge bar 59 to another contact terminal 60. The bridging bar 59 is carried by a core 61 acted upon by the solenoid 56 and connected to this core is a stem 62 carrying a piston 63 housed in a dash pot casing 64.

The end of the solenoid coil 56 remote from that connected to the conductor 54 is connected by a conductor 65 to the adjustable member 66 of an adjustable resistance 67, which in turn is connected to one end of the winding 68 of a transformer 69, the other terminal of the winding 68 being connected to the conductor 55. The other winding 70 of the transformer 69 is connected on one side to the brush 43 and on the other side to the brush 45, while at an intermediate point this winding is connected by a conductor 71 to the ground 52.

The contact terminal 60 is connected by a conductor 71 to the movable element 72 of an adjustable resistance 73, which latter is connected to one terminal of a solenoid winding 74, the other terminal of which is connected by a conductor 75 to the conductor 55. The solenoid winding 74 controls a core 76 connected by a bar 77 of insulating material to the contact plates 39 and 40, so that these plates are moved by the core 76 as controlled by the solenoid 74. The core 76 is provided with a stem 78 terminating in a piston 79 within a dash pot casing 80.

The brush 44 is connected by a conductor 81 to the brush 48 and the brush 46 is connected by a conductor 82 to the brush 47. The conductors 81 and 82 are, as will hereinafter appear, designed to carry the power current when the conductors 5 and 6 are out of service for any reason, and while these conductors 81 and 82 are shown in the drawings by comparatively fine lines, the fineness of the lines are for differentiating purposes only, and have no other significance. The conductors 81 and 82 are coextensive with the conductors 5 and 6 and constitute an auxiliary section designated as $a$—$b$. Similar auxiliary sections $c$—$d$ and $e$—$f$ are provided for the main sections C—D and E—F.

Coupled across the conductors 5 and 6 near the ends thereof remote from the transformer 50 is the winding 83 of a transformer 84 having its other winding 85 connected by respective conductors 86—87 to the opposite ends of the solenoid coil 88, which coil controls a core 89 carrying the contact plates 41 and 42 at the ends of a bar 90 of insulating material. The core 89 is provided with a stem 91 having a piston 92 at its end housed within a dash pot casing 93. It will be understood that the bars 77 and 90 of insulating material may be of other material so long as the plates carried thereby are insulated one from the other.

Let it be assumed that the voltage of the transmission line is "V" volts, and that the apparatus forming the subject-matter of the present invention is so set that should this voltage drop at any point on the line to V—$x$ volts (where $x$ may equal any value from V down to say ten per cent. of V), this section in which this drop of voltage occurs will be automatically cut out and the corresponding auxiliary section will be cut in.

Assume that there are V volts upon the line, this representing working conditions, under these circumstances the transformer 50 is traversed by V volts so that the current generated in the winding 53 of this transformer has a corresponding pressure. The winding 53 is connected by the conductor 55 to the conductor 75, so that current generated in this winding passes through the coil 74, thence through the resistance 73 to the conductor 71, thence to the contact 60, bridge bar 59, contact 58, conductor 57 and conductor 54 back to the coil 53. The solenoid coil 74 being energized, the core 76 is drawn thereinto and the contact plates 39 and 40 are held away from the respective brushes 43—44—45 and 46, and in bridging relation to the brushes 11—13 and 12—15. In like manner the winding 83 of the transformer 84 is traversed by V volts and the coil 68 is energized to maintain the plates 41 and 42 out of contact with the brushes 47 and 48 and in bridging relation to the brushes 16—21 and 14—24, respectively. There is likewise established a circuit from the winding 53 by way of the conductor 55 to the winding 68 of the transformer 69 through the resistance 67 and solenoid winding 56, returning through the conductor 54, but the resistance of this circuit is so related to the circuit including the winding 74 that insufficient current traverses the solenoid winding 56 to move the core 61 to carry the bridging bar 59 away from the contacts 58 and 60. This same condition prevails in all of the sections A—B, C—D and E—F and consequently the continuity of the circuit through the conductors 1—2, 5—6, 7—8, 9—10 and 3—4 is maintained, and will be maintained so long as V volts prevail upon such circuit. The normal working condition of the system as just described is shown in Fig. 1.

Figure 2:
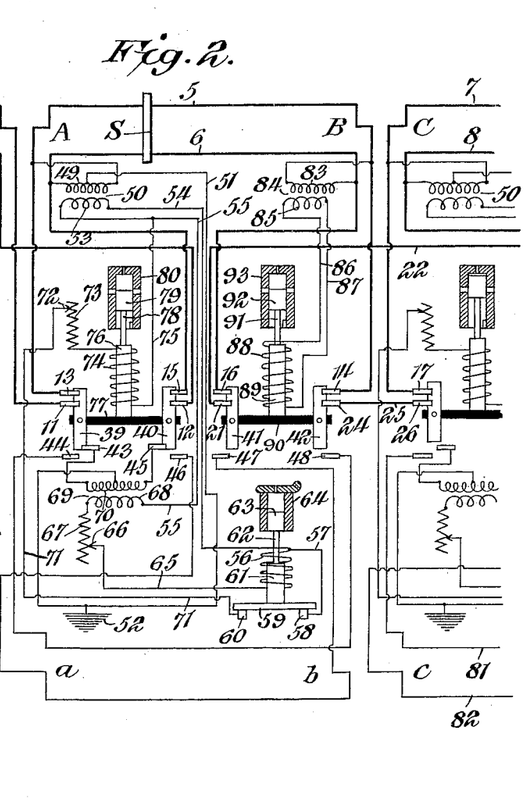
Fig. 2 is a diagram coextensive with a portion of the diagram of Fig. 1, but showing a step in the progressive action of the protective system.
Figure 3:
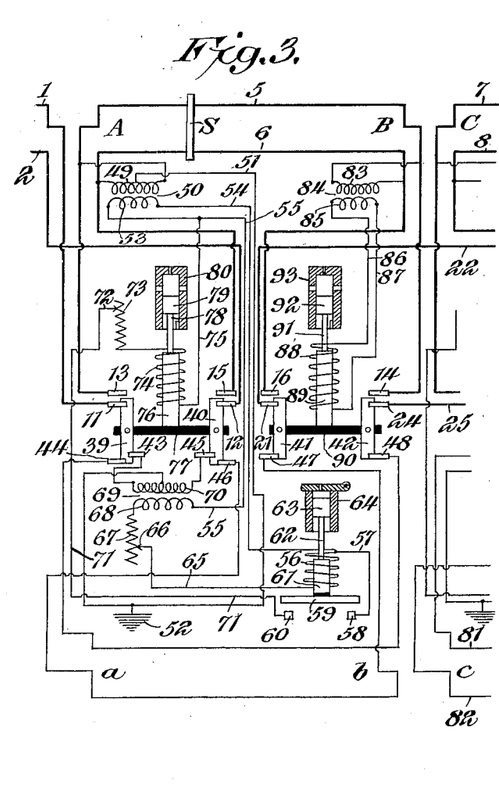
Fig. 3 is a diagram similar to that of Fig. 2, but showing the conditions prevalent when a fault has occurred in the main transmission line where protected by the invention.

Let it be assumed that in section A—B some condition arises which will cause a drop of voltage until it reaches V—$x$, as, for instance, a short circuit caused by the bridging of the conductors A—B by some conducting substance indicated at S, Fig. 2. A like drop in voltage, therefore, occurs in the winding 49 of the transformer 50 and to a proportionate extent in the winding 53 thereof, considering the transformer 50 a step down transformer in the particular system shown. This will cause a drop in current in the circuit which may be traced from the winding 53 by conductor 75 through the winding of the solenoid 74, thence by the resistance 73, contact 72, conductor 71, contact 60, bridging bar 59, contact 58, conductor 57 and conductor 54 back to the coil 53, so that the solenoid 74 is no longer sufficiently energized to maintain the core 76 in the position shown in Fig. 1 and accordingly the core 76 will move in a direction to carry the contact plates 39 and 40 into engagement with the brushes or terminals 43 and 45, respectively. The initial movement of the core 76 is slow because of the effect of the dash pot 80 and the brushes 13 and 15 may be considered as still connected to the plates 39 and 40, so that the condition assumed is that shown in Fig. 2. The solenoid 56 remains unaffected during the operation just described. The further movement of the core 76 is not retarded by the dash pot and consequently the plates 39 and 40 are quickly brought into engagement with the brushes 44 and 46, respectively, and immediately thereafter break contact with the brushes 13 and 15, respectively, the break being rapid. The faulty section A—B is thus cut out and the perfect auxiliary section $a$—$b$ is cut in. Now, the full normal voltage is impressed on the transformer 69 and a commensurate voltage will be set up in the winding 68 of this transformer and in a closed circuit therefrom which may be traced as follows:—from the coil 68 by the resistance 67, contact 66, conductor 65, solenoid winding 56, conductor 54, winding 53, and conductor 55 back to the winding 68. This circuit includes the winding 53 of the transformer 50, and the other winding 49 of this transformer is short circuited by the assumed short circuit S across the conductors 5 and 6. There is, therefore, a heavy demand upon the circuit now fed by the transformer winding 68, and this heavy current will pass through the winding 56 and is efficient to cause this solenoid to attract its core 61 quickly and thereby break the main centralizing switch solenoid circuit at the contacts 58 and 60, this condition of the circuit being shown in Fig. 3. The cutting out of the solenoid 74 persists so long as the short circuit S persists.

The solenoid 88 being deprived of effective current by the short circuit S cutting out the transformer 84, has in the meantime acted in the same manner as the solenoid 74, moving slowly at first, and then quickly, so that the plates 41 and 42 move into engagement with the brushes 47 and 48, respectively, just prior to breaking contact with the brushes 14 and 16. The same result occurs if either conductor 5 or 6 be grounded, the only difference being that in such case one-half the winding 49 is short circuited instead of the entire winding.

Let it be now assumed that the short circuit or ground which has occurred in the section A—B be either naturally or artificially removed, so that normal conditions in the main line section are restored so far as its capability of transmission is concerned. In the condition of the circuit shown in Fig. 3 the main line section is cut out and the auxiliary section is being employed for the transmission of power. The short circuit or ground having been removed, the transformer winding 49 is open except for the small load due to the transformer 84 at the other end of the section. Now, the winding 53 will only draw magnetizing current for the energization of the transformer 50, and as this current passes through the solenoid 56 and because of its feeble character is insufficient to energize the solenoid 56 actively, the core 61 will no longer be attracted and the bar 59 will move into bridging relation to the contacts 58 and 60. There is now established a closed circuit which may be traced from the contact 58, to the conductor 57, thence through the winding 56, thence through the conductor 65, thence through the contact 66 and resistance 67 to and through the winding 68, thence by the conductor 55 to the conductor 75, thence through the solenoid 74, thence through the resistance 73 and contact 72, thence by way of the conductor 71 back to the contact 60 connected to the contact 58 by the bridging bar 59. Now, the winding 68 of the transformer 69 is supplying current to the solenoid 74 the same as the winding 53 of the transformer 50 did under normal conditions, and, therefore, the armature 76 will be attracted moving quickly until it connects the plates 39 and 40 with the brushes 13 and 15, respectively, without as yet disconnecting these plates from the brushes 44 and 46, the normal voltage being thereby impressed upon the main line section A—B. This will cause the energization of the transformer 84 and the feeding of the solenoid 88 with sufficient current to render it active, so that the plates 41 and 42 are brought into engagement with the brushes 16 and 14, respectively. The active movement of the armatures or cores of the two solenoids continues until the auxiliary section is cut out and the main line section is restored to service. It is to be observed that the main line section is entirely cut in before the auxiliary section is cut out, so that there is no interruption of the service when the main line section is cut in after it has been once cut out. The same operations take place in the sections C—D or E—F if like faulty conditions should be established therein and such faulty conditions may occur in all the sections without interruption of the service, since the current will be diverted from the normal path through the auxiliary sections $a$—$b$, $c$—$d$, $e$—$f$ as occasion requires. Of course, the various brushes or circuit terminals where the circuit is made or broken are, in high tension transmission systems, immersed in oil, as is the usual practice.

Again, let it be assumed that the main line section A—B was only temporarily cut out of service, as, for instance, when there occurs an electrical surge due, say, to a lightning stroke which would cause a flash over an insulator on the main line section A—B, such flash-over being followed up by a heavy power-arc causing a drop in voltage sufficient to actuate the automatic sectionalizer switches which, however, operate in time to cut out the main line section A—B before the insulator is damaged to a degree to permanently ground the line. Under such circumstances the main line section will be again cut in, on the breaking of the arc, in the manner already described.

The solenoid 56 will not respond to current caused by impressing V volts upon the main line section to which the solenoid belongs, but will respond if the voltage upon the main line be sufficiently higher than V volts. If, now, an abnormal rise in the voltage occurs in the main line, the coil 56 will be sufficiently energized to move the bridge bar 59 out of engagement with the contacts 58 and 60, thus causing a deënergization of the coil 74 and the cutting out of the section A—B as before. By making the necessary rise in voltage to sufficiently energize the coil 56 comparatively low, the system becomes protective to the apparatus or in the installation as a whole to the insulators, the transmission wires, cable insulation, conduits, or the like, although the smaller the rise in voltage necessary to operate the cut out devices, the more delicate they must be, and consequently more expensive. The primary purpose of the invention is to insure the continuity of service. The protective feature is of a secondary nature. The invention is not designed to prevent the occurrence of accidents, but to prevent accidents from interrupting the continuity of the power applied.

The invention is applicable to transmission lines of any and all kinds, whether high or low voltage, alternating current systems of the single or polyphase type, or high or low voltage direct current systems, it only being necessary to substitute appropriate resistances in place of the transformers when direct currents are employed instead of alternating currents. While for simplicity of illustration the drawings show the power as applied from one end, it is, of course, evident that the power may be tapped off or cut into the system at any point which is not on a circuit liable to be cut out. Furthermore, the protecting sections may be long or the apparatus may be duplicated in one or more or all of the sections, so that under some circumstances where there is danger of accidents occurring in the auxiliary sections, such sections may, in turn, be protected by additional or sub-auxiliary sections. Where the danger of accidents is small, the sections may be quite long, but where the danger of accident is greater, the number of sections may be increased by shortening their length, and sub-auxiliary sections may be installed. All these matters depend upon the conditions to be met and no general arrangement can be shown adapted to all the conditions of installation.

The dash pots prevent the operation of the switches from variations in the voltage of the line of sudden and temporary character, such as are liable to occur in the normal operation of the system, and it is only such conditions as will cause a sufficiently prolonged interruption to permit the sluggish movement of the switches to an extent to cut out the section wherein the accident occurs that will cause the system of the present invention to become effective.

What is claimed:—

1. In a system of electrical distribution, main line sections, means at each end of each main line section for coupling the sections in series to normally maintain the electrical continuity of the system, said means being active on the maintenance of the normal voltage in the system, companion auxiliary sections individual to the main sections, and means responsive to abnormal voltage conditions in the system for causing the coupling means for the sections to include an auxiliary section to the total electrical exclusion of its companion main line section.

2. In a system of electrical distribution, a main line sectionalized at predetermined points, auxiliary sections individual to the main line sections, means at each end of each main line section responsive to the normal voltage of the line for maintaining the main line sections in the line and operable to include corresponding auxiliary sections in the line, and means responsive to abnormal changes in the main line voltage for causing the operation of the first named means to totally electrically exclude main line sections from the line and include companion auxiliary sections in said main line.

3. In a system of electrical distribution, main line sections, auxiliary sections individual to the main line sections, switches in each main line section at the ends thereof and having electric means maintained active to include the respective main line sections in the power circuit by the maintenance of the normal voltage of the line, and another switch for each section inactive to normal conditions on the main line and responsive to abnormal voltage conditions to cut out the electric means of one of the first named switches of the respective section.

4. In a system of electrical distribution, line conductors in sections, switches for coupling the line conductors together to establish the continuity of the system, electric means for actuating the switches to maintain the continuity of the conductors, each switch being responsive to current due to the maintenance of a predetermined voltage upon the line conductors, an auxiliary section of line conductors for each of the first named sections and individual thereto, and means for causing a switch to exclude a main section and couple into the system an auxiliary section on an abnormal sustained change of voltage in the first named section.

5. In a system of electrical distribution, a sectionalized main line, auxiliary sections individual to the main line sections, means for maintaining the continuity of the section through the main line sections under normal conditions, and means for excluding a main line section and including a companion auxiliary section on a maintained abnormal change in the electrical conditions on the line, the auxiliary section being included in the line prior to the exclusion of the companion main line section.

6. In a system of electrical distribution, a sectionalized main line, a switch in each section for normally maintaining the electrical continuity of the main line intact through the section controlled by said switch, means responsive to predetermined voltage conditions in the main line section for maintaining the switch in the circuit closing position with respect to its section, an auxiliary line section for each main line section, and means responsive to abnormal changes in the voltage conditions of the main line section for causing the switch to operate to couple in the auxiliary section and exclude the companion main line section.

7. In a system of electrical distribution, a sectionalized main line, a switch in each section for normally maintaining the electrical continuity of the main line intact through the section controlled by said switch, means responsive to predetermined voltage conditions in the main line section for maintaining the switch in the circuit closing position with respect to its section, an auxiliary line section for each main line section, and means responsive to abnormal changes in the voltage conditions of the main line section for causing the switch to operate to couple in the auxiliary section and exclude the companion main line section, the switch being related to the two sections to couple the auxiliary section into the circuit prior to the exclusion of the main line section controlled by said switch.

8. In a system of electrical distribution, a sectionalized main line, auxiliary sections individual to the main line sections, a switch for maintaining the main line sections in circuit during the prevalence of normal conditions, such switch being provided with a holding coil responsive to predetermined voltage conditions on the main line and said switch movable to cut in the auxiliary section and exclude the main section on the establishment of abnormal voltage conditions on the main line, and means responsive to abnormal conditions in the main line section for cutting out the switch holding coil from the circuit on the establishment of such conditions.

9. In a system of electrical distribution, sectionalized main line conductors, auxiliary conductor sections individual to and coextensive with the main sections, sluggish switches for completing the circuit through the main sections and provided with holding coils responsive to normal conditions on the main line to maintain the circuit through such main sections, said holding coils of the switches being responsive to abnormal conditions on the main line to include the auxiliary sections therein and exclude the main sections, and sluggish means for each section responsive to abnormal electrical conditions on the line and controlling the switches controlling the main and auxiliary sections by cutting out said holding coils on the establishing of abnormal electrical conditions on the line.

10. In a system of electrical distribution, a sectionalized main line, auxiliary sections individual to and coextensive with the main sections, switches for establishing the circuit through the main sections or the auxiliary sections, said switches having a normal tendency to close the circuit to the auxiliary sections, and electrical means for actuating the switches at each end of each section in opposition to their normal tendency to close the circuit through the main sections, said electrical means being active to normal electrical conditions in the system.

11. In a system of electrical distribution, main and auxiliary conductors, a switch for coupling the main or auxiliary conductors in the circuit to maintain the continuity thereof, said switch having a normal tendency to close the circuit through the auxiliary conductors, means responsive to normal electrical conditions on the line for holding the switch in position to close the line through the main conductors, and means responsive to abnormal conditions established in the section defined by the main conductors of the section to cut out the switch holding means on the production of abnormal conditions in the main line section.

12. In an electrical system of distribution, a main line section of conductors, an auxiliary section of conductors individual to the main line section and coextensive therewith, the main section and auxiliary section having adjacent circuit terminals, a switch at each end of and common to the circuit terminals of each main line and companion auxiliary sections for coupling a power circuit to the terminals of either the main section or the auxiliary section and having an extent or range of movement sufficient to couple either and both the main section and the auxiliary section to the power line, and means responsive to electrical conditions in the main section for maintaining the same in the main circuit or for establishing the power circuit through the auxiliary section to the exclusion of the main section.

13. In a system of electrical distribution, a power circuit, a main section of conductors, an auxiliary section of conductors individual thereto, a switch at each end of and common to each main line and companion auxiliary sections for coupling the main section or the auxiliary section into the power circuit to maintain the continuity thereof, and an electric circuit bridged across the main circuit and provided with means for operating the switches, said bridging circuit responding to normal electrical conditions on the line to actuate the switches to then maintain the main section in circuit to the exclusion of the auxiliary section, the switches having a normal tendency to include the auxiliary conductors in the power circuit.

14. In an electrical system of distribution, a power circuit, sectional conductors adapted to be included in and form part of the power circuit, other sectional conductors constituting auxiliary sections adapted to be included in the power circuit in lieu of the first named or main sections, a switch for each end of each main section having a normal tendency to close the power circuit on to the corresponding auxiliary section, electrical means for actuating the switches to close the circuit through the main section on the establishment of normal conditions in said main section, and electrically operated means for controlling the electrical means actuating the switches, said last named electrical means being controlled by one of the switches.

15. In an electrical system of distribution, a power circuit, sectional conductors adapted to be included in and form part of the power circuit, other sectional conductors constituting auxiliary sections adapted to be included in the power circuit in lieu of the first named or main sections, a switch for each end of each main section having a normal tendency to close the power circuit on to the corresponding auxiliary section, grounded electrical means for actuating the switches to close the circuit through the main section on the establishment of normal conditions in said main section, and electrically operated means for controlling the electrical means actuating the switches, said last named electrical means being controlled by one of the switches and having a ground connection.

16. In a system of electrical distribution, main line sections, companion auxiliary sections individual to the main line sections, means active on the maintenance of the normal voltage in the system for coupling said main sections in series to normally maintain the continuity of the system and operating on the establishment of abnormal conditions to replace the main sections by the companion auxiliary sections, and normally inactive means responsive to abnormal voltage conditions in the system to maintain the first named means inactive during the prevalence of such abnormal conditions.

17. In a system of electrical distribution, main line sections, companion auxiliary sections individual to the main sections, means adjacent each end of each main line section for coupling the said sections in series to normally maintain the continuity of the system, said means being active on the maintenance of the normal voltage in the system, and means responsive to abnormal voltage conditions in the system for including an auxiliary section to the exclusion of its companion main line section.

18. In a system of electrical distribution, a main line section, a companion auxiliary section individual to the main line section, a switch for cutting out the main line section and cutting in the auxiliary section in place thereof, electro-magnetic means fed by the main line section for normally maintaining the switch in position to couple the main line section in the circuit, and a normally inactive circuit controlling means in the circuit of the said electro-magnetic means, said circuit controller being inactive to normal voltage conditions in the system and responsive to abnormal voltage conditions to break the circuit through the said electro-magnetic switch controlling means.

19. In a system of electrical distribution, a main line section, a companion auxiliary section individual to the main line section, a switch movable to include either the main section or the auxiliary section in the system, electromagnetic means controlled by the main line section for maintaining the switch in position to electrically couple the main line section in the system during the prevalence of normal voltage conditions, a normally inactive switch establishing the continuity of the circuit of the electro-magnetic means controlled by the main line, and means controlled by the first named switch for rendering the second named switch active to break the continuity of the circuit of the electro-magnetic switch controlling means on the establishment of predetermined abnormal voltage conditions.

20. In a system of electrical distribution, main line sections, companion auxiliary sections individual to the main line sections, switches for electrically cutting in and out the main line sections with a corresponding cutting out and in of the companion auxiliary sections, electro-magnetic means for maintaining each switch in position to electrically include the corresponding main line section in the system, inductive means coupled to the corresponding main line section and normally feeding the electro-magnetic switch operating means, a normally inactive switch in the circuit of the first named switch operating means, electro-magnetic means for operating the second switch included in the circuit of the inductive means fed by the main line section, and inductive means for impressing current on the circuit of the electro-magnetic operating means of the second switch having means controlled by the first named switch for coupling the power circuit thereto.

21. In a system of electrical distribution, main line sections, companion auxiliary sections individual to the main line sections, a transformer having one coil branched across a main line section, a switch controlling the terminals of the main line section for coupling it to the terminals of a power circuit, electro-magnetic means for normally maintaining the switch in position to couple the main line section to the power circuit, said electro-magnetic means being in circuit with the other coil of the transformer, another switch normally maintaining the continuity of the circuit of the electro-magnetic means controlling the first named switch, electro-magnetic means for operating the second named switch to break the continuity of the circuit of the electro-magnetic means controlling the first named switch, and a transformer having one winding in circuit with the electro-magnetic operating means of the second switch, and the other coil provided with terminals in the path of the first named switch on its movement in the direction to cut out the main line section controlled thereby.

22. In a system of electrical distribution, main line sections, companion auxiliary sections individual to the main line sections, a transformer having one coil branched across a main line section, a switch controlling the terminals of the main line section for coupling it to the terminals of a power circuit, electro-magnetic means for normally maintaining the switch in position to couple the main line section to the power circuit, said electro-magnetic means being in circuit with the other coil of the transformer, another switch normally maintaining the continuity of the circuit of the electro-magnetic means controlling the first named switch, electro-magnetic means for operating the second named switch to break the continuity of the circuit of the electro-magnetic means controlling the first named switch, and a transformer having one winding in circuit with the electro-magnetic means of the second switch and the other coil provided with terminals in the path of the first named switch on its movement in the direction to cut out the main line section controlled thereby, the first named coil of the first named transformer and the second named coil of the second named transformer being intermediately connected together and to ground.

23. In a system of electrical distribution, main line sections, companion auxiliary sections individual to the main sections, a switch for coupling each main line section electrically in the system, operating means for the switch responsive to normal voltage conditions to maintain the continuity of the system through the main line section, circuit terminals in each auxiliary section in the path of the switch controlling the companion main line section, means responsive to abnormal circuit conditions for cutting out the operating means for maintaining the switches in position to close the circuit on to the main line sections, and electro-magnetic means for controlling the cut-out means having circuit terminals in the path of the switch for engagement thereby prior to the coupling of the auxiliary section in the circuit.

24. In a system of electrical distribution, main line sections, companion auxiliary sections individual to the main sections, a switch for coupling each main line section electrically in the system, operating means for the switch responsive to normal voltage conditions to maintain the continuity of the system through the main line section, circuit terminals for each auxiliary section in the path of the switch controlling the companion main line section, means responsive to abnormal circuit conditions for cutting out the operating means for maintaining the switches in position to close the circuit on to the main line sections, and electro-magnetic means for controlling the cut-out means having circuit terminals in the path of the switch for engagement thereby prior to the coupling of the auxiliary section in the circuit, said switches maintaining the auxiliary section and the electro-magnetic controlling means for the cut-out means in the power circuit during the prevalence of abnormal voltage conditions.

25. In a system of electrical distribution, main line sections, companion auxiliary sections individual to the main sections, a switch adjacent each end of each main line section for normally maintaining the continuity of the system through the main line sections, electro-magnetic means controlling each switch and in turn controlled by the respective main line section for maintaining the switch in active position to include the main line section in the circuit during the prevalence of normal voltage conditions, said switch being movable to cut out the respective main line section and cut in the companion auxiliary section, and a normally inactive cut out means for one of the switches, said last named means being responsive to abnormal voltage conditions.

26. In a system of electrical distribution, main line sections, companion auxiliary sections individual to the main sections, the main sections and auxiliary sections having adjacent terminals at each end, a switch at the corresponding ends of each main and companion section for coupling one or the other section electrically into the system, electro-magnetic means for normally maintaining the switch in position to couple the main section into the system, a transformer for each switch operating means fed by the main line section, another switch included in the circuit of the electro-magnetic actuating means for one of the switches, actuating means for the second named switch having electric connections with the transformer controlling said switch, another transformer having one coil included in the circuit of the actuating means of the second named switch and having its other coil provided with circuit terminals in the path of one of the first named switches controlled by the second named switch, and electric connections between an intermediate point of the second named coil of the last named transformer and that coil of the first named transformer fed directly by the main section, the first named switches being related to the circuit terminals controlled thereby to couple up the auxiliary section prior to the uncoupling of the main section, and all the switches having means for causing sluggish movement.

In testimony, that I claim the foregoing as my own, I have hereto affixed my signature in the presence of two witnesses.

FAIRBANKS C. HIRDLER.

Witnesses:
WALTER H. WARE,
LAWRENCE T. BERGER.

---

Copies of this patent may be obtained for five cents each, by addressing the "Commissioner of Patents, Washington, D. C."